US010902551B1

United States Patent
Mellado Bataller et al.

(10) Patent No.: US 10,902,551 B1
(45) Date of Patent: Jan. 26, 2021

(54) TRUE POSITIVE TRANSPLANT

(71) Applicant: X Development LLC, Mountain View, CA (US)

(72) Inventors: Ignacio Pablo Mellado Bataller, San Jose, CA (US); Patrick Christopher Leger, Mountain View, CA (US); Alexa Greenberg, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/717,013

(22) Filed: Dec. 17, 2019

(51) Int. Cl.
*G06T 3/00* (2006.01)
*G06T 7/194* (2017.01)
*G06T 7/70* (2017.01)
*G06K 9/62* (2006.01)
*G06F 3/0484* (2013.01)

(52) U.S. Cl.
CPC ......... *G06T 3/0006* (2013.01); *G06F 3/0484* (2013.01); *G06K 9/6256* (2013.01); *G06K 9/6269* (2013.01); *G06T 7/194* (2017.01); *G06T 7/70* (2017.01); *G06T 2207/20081* (2013.01); *G06T 2207/20084* (2013.01)

(58) Field of Classification Search
CPC ......... G06T 3/0006; G06T 7/194; G06T 7/70; G06F 3/0484; G06K 9/6256; G06K 9/6269
See application file for complete search history.

(56) References Cited

U.S. PATENT DOCUMENTS

2018/0260668 A1* 9/2018 Shen ................. G06T 11/00
2019/0043003 A1* 2/2019 Fisher ............... G01S 3/00
2020/0273176 A1* 8/2020 Takeda .............. G06T 7/194

FOREIGN PATENT DOCUMENTS

CN 101221623 B * 11/2011

OTHER PUBLICATIONS

Beery et al., "Synthetic Examples Improve Generalization for Rare Classes," Arvix.org, Cornell University Library, Apr. 11, 2019, 15 pages.

* cited by examiner

*Primary Examiner* — Sarah Lhymn
(74) *Attorney, Agent, or Firm* — McDonnell Boehnen Hulbert & Berghoff LLP

(57) ABSTRACT

Systems and methods for augmenting a data set are provided. An example method may include locating a foreground object disposed within a seed image, identifying an object class corresponding to the foreground object, and, based on the identified object class, determining a target value for an object property of the foreground object. The example method may also include applying a transformation function to transform the foreground object into a transformed object, where the transformation function modifies the object property of the foreground object from having an initial value to having the target value. The example method may further include transplanting the transformed object into a background image so as to produce an augmented image and augmenting an initial set of images with the augmented image so as to produce an augmented set of images for training a predictive model.

20 Claims, 7 Drawing Sheets

TRUE POSITIVE TRANSPLANT

BACKGROUND

In statistics or machine learning, "overfitting" is when a predictive model makes inferences that correspond too closely or exactly to a particular data set. When overfitting occurs, the predictive model often contains superfluous parameters that capture idiosyncrasies of the particular data set. Because of these parameters, the predictive model generally performs well on the particular data set, but performs poorly on new, previously unseen data sets.

SUMMARY

Example embodiments involve a data augmentation system. The system may include a segmentation module operable to segment a foreground object in an image from a background of the image. The system may also include a transformation module operable to transform one or more object properties of an object. Using these two modules, the system may generate augmented images that contain variations of the foreground object.

In a first aspect, a computer-implemented method is provided. The method includes locating, by a computing system, a foreground object disposed within a seed image, where the computing system includes an initial set of images for training a predictive model. The method also includes identifying, by the computing system, an object class corresponding to the foreground object. The method further includes, based on the identified object class, determining, by the computing system, a target value for an object property of the foreground object. The method also includes applying, by the computing system, a transformation function to transform the foreground object into a transformed object, where the transformation function modifies the object property of the foreground object from having an initial value to having the target value. The method additionally includes transplanting, by the computing system, the transformed object into a background image so as to produce an augmented image. The method even further includes augmenting, by the computing system, the initial set of images with the augmented image so as to produce an augmented set of images for training the predictive model.

In a second aspect, a computing system is provided. The computing system may include an initial set of images for training a predictive model. The computing system may also include one or more processors configured to cause the computing system to carry out operations. The operations may include locating a foreground object disposed within a seed image. The operations may also include identifying an object class corresponding to the foreground object. The operations may further include, based on the identified object class, determining a target value for an object property of the foreground object. The operations may additionally include applying a transformation function to transform the foreground object into a transformed object, where the transformation function modifies the object property of the foreground object from having an initial value to having the target value. The operations may further include transplanting the transformed object into a background image so as to produce an augmented image. The operations may even further include augmenting the initial set of images with the augmented image so as to produce an augmented set of images for training the predictive model.

In a third aspect, an article of manufacture is provided. The article of manufacture may include a non-transitory computer-readable medium having stored thereon program instructions that, upon execution by one or more processors of a computing system that contains an initial set of images for training a predictive model, cause the computing system to carry out operations. The operations may include locating a foreground object disposed within a seed image. The operations may also include identifying an object class corresponding to the foreground object. The operations may further include, based on the identified object class, determining a target value for an object property of the foreground object. The operations may additionally include applying a transformation function to transform the foreground object into a transformed object, where the transformation function modifies the object property of the foreground object from having an initial value to having the target value. The operations may further include transplanting the transformed object into a background image so as to produce an augmented image. The operations may even further include augmenting the initial set of images with the augmented image so as to produce an augmented set of images for training the predictive model.

Other aspects, embodiments, and implementations will become apparent to those of ordinary skill in the art by reading the following detailed description, with reference where appropriate to the accompanying drawings.

DETAILED DESCRIPTION

Figure 1:
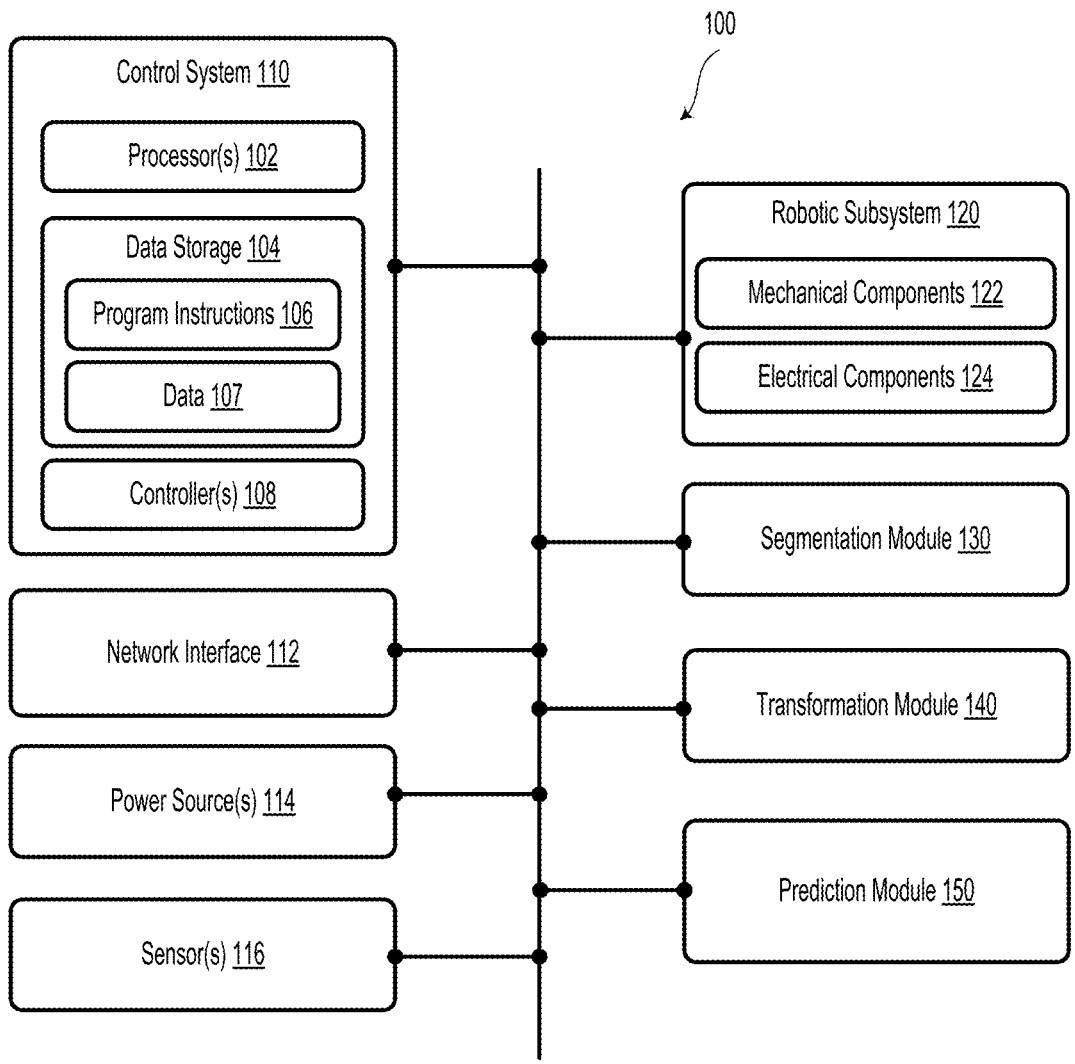
FIG. 1 illustrates a computing system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Lack of diversity in training data is known to cause overfitting. For example, if a predictive model was being trained to classify objects in images but only had training data containing images of chairs disposed in an outdoor environment, then the trained version of the predictive model could produce stellar results when applied to images containing chairs disposed in an outdoor environment, but could produce poor results when applied to images containing chairs disposed in other environments (e.g., chairs disposed in a living room environment).

One solution to address this lack of diversity is to generate more varied training data. In the field of object classification and detection, this would typically involve collecting images from a wide variety of environments (e.g., living rooms, dining rooms, outdoors, offices spaces, conference rooms, etc.) and then having a human manually label the objects contained within the images. However, as the need for large amounts of training data increases, for instance to train robotic or autonomous vehicle object detection modules, the process of collecting images and manually labeling objects therein becomes unduly time consuming and inefficient.

Disclosed herein are systems and methods that may help address this technical problem. In some examples, a computing system could be configured to augment an initial set of training images with one or more "augmented images". Such augmented images could include variations of the objects contained in the initial set of training images. For instance, if the initial set of training images contained an image with a chair, then the augmented images could include images with variations of that chair. As one example, the augmented images could include images that depict the chair rotated at different angles (e.g., the chair rotated at 90° from its original orientation, the chair rotated at 180° from its original orientation, etc.). As another example, the augmented images could include images with the chair disposed in different background environments (e.g., the chair disposed in kitchen environment, the chair disposed in a living room environment, the chair disposed in a bedroom environment, etc.). As yet another example, the augmented images could include images with the chair scaled to different sizes (e.g., the height of the chair scaled down 50% from its original size, the height of the chair scaled up 50% from its original size, etc.). Other variations could also exist.

To facilitate this process, the computing system may include a segmentation module operable to receive an image and responsively segment object(s) disposed within the image from the background of the image. The images provided to the segmentation module could be considered to be "seed images" because the objects within these images may be used as a basis to generate hundreds, if not thousands of augmented images. In some embodiments, a human operator could provide any or all of the seed images, including the locations of object(s) within the seed images and object classes of the object(s) within the seed images. In further embodiments, the computing system may receive pre-segmented object(s) from a client device, in which case the operations of the segmentation module may be optional.

The computing system may also include a transformation module operable to receive object(s) segmented by the segmentation module and responsively apply a transformation function to transform the segmented object(s) into one or more transformed objects. Then, the transformation module could transplant the transformed object(s) into one or more background images so as to produce one or more augmented images. The transformation module could add the augmented image(s) to an initial set of training images to produce an augmented set of images for training a predictive model.

In example embodiments, the transformation module could utilize the ground truth property values of the object(s) being transformed as a basis to perform intelligent and representative object transformations. For example, if images with chairs generally depict chairs having heights between 50-100 centimeters (cm), then a representative transformation of a chair would transform the chair to have a height between 50-100 cm. As another example, if images with fire hydrants generally depict fire hydrants being colored either red or yellow, then a representative transformation of a fire hydrant would transform the fire hydrant to be colored either red or yellow. A technical advantage of this approach is that the object transformations are based on actual object properties exhibited in real-world images. This can improve the performance of the predictive model when it makes inferences on real-world images.

The transformation module described herein could also contain background images taken/captured from a wide variety of environments. For instance, the transformation module may contain background images taken/captured from parks, offices, streets, playgrounds, beaches, homes, and so on. The transformation module could transplant transformed object(s) into these background images to create augmented image(s) for training the predictive model. Advantageously, the variability of the background images helps to further increase the diversity of the augmented image(s) generated by the transformation module.

Examples described herein also provide for a system that automatically detects class imbalances in training data and responsively generates augmented image(s) that can balance the disproportional training data. In an example process, upon detecting a class imbalance, the described system could pause or otherwise halt the training process of a predictive model. Using the aforementioned segmentation module, the system could segment poorly represented object(s) disposed in the training data. Afterwards, the described system could apply the aforementioned transformation module to generate augmented image(s) using the segmented object(s). These augmented image(s) could be added to the training data to create augmented training data. The described system could later resume the training process with the augmented training data.

The example computing systems described herein may be part of or may take the form of a robotic system. Such a robotic system may include sensors for capturing information of the environment in which the robotic system is operating. For example, the sensors may monitor the environment in real time, and detect obstacles, elements of the terrain, weather conditions, temperature, or other aspects of the environment. The sensors may capture data corresponding to one or more characteristics of objects in the environment, such as a size, shape, profile, structure, or orientation of the objects. The robotic system may use the captured sensor information as input into the aforementioned predictive models, which may assist the robotic system with classifying/identifying objects in its environment.

In further examples, when navigating through an environment, the robotic system may capture images of the environment and may store the captured images for later use. Then, in order to train the aforementioned predictive models, the robotic system may use the methods described herein to add augmented images to the images previously captured representing the robotic system's environment. Because the robotic system may operate in a limited set of environments—and thus only captures images from the limited set of environments—the augmented images can help the robotic system identify objects and otherwise operate in previously unseen environments. In further examples, a central computing system may receive images from multiple robotic devices, and may use the images to develop augmented training image sets for use by any or all of the robotic devices.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

II. Example Computing Systems

FIG. 1 illustrates computing system 100, in accordance with example embodiments. Computing system 100 may be an example system that could automatically augment an initial set of training images with one or more augmented images. Computing system 100 may be implemented in various forms, such as a server device, mobile device, a robotic device, an autonomous vehicle, or some other arrangement. Some example implementations involve a computing system 100 engineered to be low cost at scale and designed to support a variety of tasks. Computing system 100 may also be optimized for machine learning.

As shown in FIG. 1, computing system 100 may include processor(s) 102, data storage 104, and controller(s) 108, which together may be part of control system 110. Computing system 100 may also include network interface 112, power source 114, sensors 116, robotic subsystem 120, segmentation module 130, transformation module 140, and prediction module 150. Nonetheless, computing system 100 is shown for illustrative purposes, and may include more or fewer components. The various components of computing system 100 may be connected in any manner, including wired or wireless connections. Further, in some examples, components of computing system 100 may be distributed among multiple physical entities rather than a single physical entity. Other example illustrations of computing system 100 may exist as well.

Processor(s) 102 may operate as one or more general-purpose hardware processors and/or one or more special purpose processors (e.g., digital signal processors (DSPs), tensor processing units (TPUs), graphics processing units (GPUs), application specific integrated circuits (ASICs), etc.). Processor(s) 102 may be configured to execute computer-readable program instructions 106, and manipulate data 107, both of which are stored in data storage 104. Processor(s) 102 may also directly or indirectly interact with other components of computing system 100, such as network interface 112, power source 114, sensors 116, robotic subsystem 120, segmentation module 130, transformation module 140, and prediction module 150. In example embodiments, processor(s) 102 may be configured to execute instructions stored in data storage 104 so as to carry out one or more operations, for example, the operations of message flow 600 or method 700 as described below.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some embodiments, data storage 104 can be a single physical device. In other embodiments, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, executable data, or diagnostic data, among other possibilities.

Controller(s) 108 may include one or more electrical circuits, units of digital logic, computer chips, or microprocessors that are configured to (perhaps among other tasks) interface between any combination of control system 110, network interface 112, power source 114, sensors 116, robotic subsystem 120, segmentation module 130, transformation module 140, and prediction module 150, or a user of computing system 100. In some implementations, controller(s) 108 may be a purpose-built embedded device for performing specific operations with one or more subsystems of computing system 100.

Control system 110 may monitor and physically change the operating conditions of computing system 100. In doing so, control system 110 may serve as a link between portions of computing system 100, such as between network interface 112, power source 114, sensors 116, robotic subsystem 120, segmentation module 130, transformation module 140, and prediction module 150. Further, control system 110 may serve as an interface between computing system 100 and a user. In some embodiments, control system 110 may include various components for communicating with computing system 100, including buttons, keyboards, etc.

During operation, control system 110 may communicate with other systems of computing system 100 via wired or wireless connections. Operations of control system 110 may be carried out by processor(s) 102. Alternatively, these operations may be carried out by controller(s) 108, or a combination of processor(s) 102 and controller(s) 108.

Network interface 112 may serve as an interface between computing system 100 and another computing device. Network interface 112 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 112 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Power source(s) 114 may be configured to supply power to various components of computing system 100. Among other possible power systems, computing system 100 may include a hydraulic system, electrical system, batteries, or other types of power systems. As an example illustration, computing system 100 may include one or more batteries configured to provide charge to components of computing system 100. Some of mechanical components 122 or electrical components 124 may each connect to a different power source, may be powered by the same power source, or be powered by multiple power sources.

Any type of power source may be used to power computing system 100, such as electrical power or a gasoline engine. Additionally or alternatively, computing system 100 may include a hydraulic system configured to provide power to mechanical components 122 using fluid power. Components of computing system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of computing system 100. Power source(s) 114 may charge using various types of charging, such as wired connections to an outside power source, wireless charging, combustion, or other examples.

Sensor(s) 116 may be arranged to sense aspects of computing system 100. Sensor(s) 116 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, computing system 100 may be configured to receive sensor data from sensors that are physically separated from the computing system (e.g., sensors that are positioned on other computing systems or located within the environment in which the computing system 100 is operating).

Sensor(s) 116 may provide sensor data to processor(s) 102 (perhaps by way of data 107) to allow for interaction of computing system 100 with its environment, as well as monitoring of the operation of computing system 100. The sensor data may be used in evaluation of various factors for activation, movement, and deactivation of mechanical components 122 and electrical components 124 by control system 110. For example, sensor(s) 116 may capture data corresponding to the terrain of the environment or location of nearby objects, which may assist with environment recognition and navigation. The information captured by sensor(s) 116 may be provided to segmentation module 130, transformation module 140, and prediction module 150 to augment a set of training data for the computing system 100.

In some examples, sensor(s) 116 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which computing system 100 is operating. Sensor(s) 116 may monitor the environment in real time, and detect obstacles, elements of the terrain, weather conditions, temperature, or other aspects of the environment. In another example, sensor(s) 116 may capture data corresponding to one or more characteristics of a target or identified object, such as a size, shape, profile, structure, or orientation of the object.

Further, computing system 100 may include sensor(s) 116 configured to receive information indicative of the state of computing system 100, including sensor(s) 116 that may monitor the state of the various components of computing system 100. Sensor(s) 116 may measure activity of systems of computing system 100 and receive information based on the operation of the various features of computing system 100, such as the operation of an extendable arm, an end effector, or other mechanical or electrical features of computing system 100. The data provided by sensor(s) 116 may enable control system 110 to determine errors in operation as well as monitor overall operation of components of computing system 100.

As an example, computing system 100 may use force/torque sensors to measure load on various components of computing system 100. In some implementations, computing system 100 may include one or more force/torque sensors on an arm or end effector to measure the load on the actuators that move one or more members of the arm or end effector. In some examples, the computing system 100 may include a force/torque sensor at or near the wrist or end effector, but not at or near other joints of a robotic arm. In further examples, computing system 100 may use one or more position sensors to sense the position of the actuators of the computing system. For instance, such position sensors may sense states of extension, retraction, positioning, or rotation of the actuators on an arm or end effector.

As another example, sensor(s) 116 may include one or more velocity or acceleration sensors. For instance, sensor(s) 116 may include an inertial measurement unit (IMU). The IMU may sense velocity and acceleration in the world frame, with respect to the gravity vector. The velocity and acceleration sensed by the IMU may then be translated to that of computing system 100 based on the location of the IMU in computing system 100 and the kinematics of computing system 100.

Computing system 100 may include other types of sensors not explicitly discussed herein. Additionally or alternatively, the computing system may use particular sensors for purposes not enumerated herein.

The mechanical components 122 in robotic subsystem 120 represent hardware of computing system 100 that may enable computing system 100 to perform physical operations. As a few examples, computing system 100 may include one or more physical members, such as an arm, an end effector, a head, a neck, a torso, a base, and wheels. The physical members or other parts of computing system 100 may further include actuators arranged to move the physical members in relation to one another. Computing system 100 may also include one or more structured bodies for housing control system 110 or other components, and may further include other types of mechanical components. The particular mechanical components 122 used may vary based on the design of the computing system, and may also be based on the operations or tasks the computing system may be configured to perform.

In some examples, mechanical components 122 may include one or more removable components. Computing system 100 may be configured to add or remove such removable components, which may involve assistance from a user. For example, computing system 100 may be configured with removable end effectors or digits that can be replaced or changed as needed or desired. In some implementations, computing system 100 may include one or more removable or replaceable battery units, control systems, power systems, bumpers, or sensors. Other types of removable components may be included within some implementations.

The electrical components 124 in robotic subsystem 120 may include various mechanisms capable of processing, transferring, or providing electrical charge or electric signals. Among possible examples, electrical components 124 may include electrical wires, circuitry, or wireless communication transmitters and receivers to enable operations of computing system 100. Electrical components 124 may interwork with mechanical components 122 to enable computing system 100 to perform various operations. Electrical components 124 may be configured to provide power from power source(s) 114 to the various mechanical components 122, for example. Further, computing system 100 may include electric motors. Other examples of electrical components 124 may exist as well.

In some embodiments, computing system 100 may include a body, which may connect to or house appendages and components of a robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 116. These sensors may be positioned in various locations on the robotic system, such as on a body, a head, a neck, a base, a torso, an arm, or an end effector, among other examples. The robotic system may be configured to carry a load, such as a type of cargo that is to be transported. In some examples, the load may be placed by the robotic system into a bin or other container attached to the robotic system. The load may also represent external batteries or other types of power sources (e.g., solar panels) that the robotic system may utilize. Carrying the load represents one example use for which the robotic system may be configured, but the robotic system may be configured to perform other operations as well.

Segmentation module 130 may be a software application, computing device, or subsystem within computing system 100 that is operable to receive seed image(s) and responsively segment object(s) disposed in the seed image(s) from the backgrounds of the seed image(s). In some implementations, segmentation module 130 may receive a single image and may segment a single object from that single image. In other implementations, segmentation module 130 may receive multiple images and may segment different objects from each of the multiple images. After segmenting the object(s), segmentation module 130 could transmit the segmented object(s) to transformation module 140.

Figure 2:
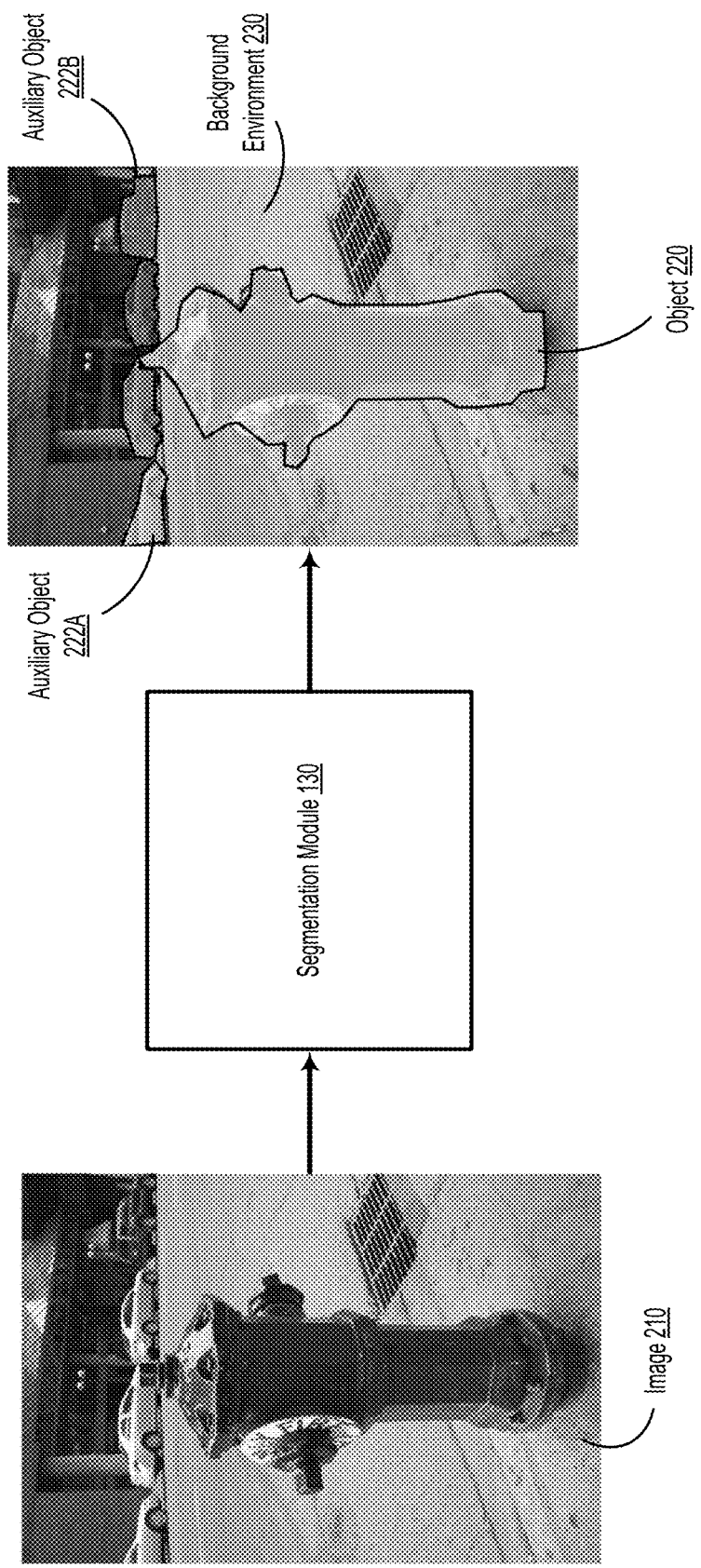
FIG. 2 illustrates operations of a segmentation module, in accordance with example embodiments.

To conceptually illustrate the operations of segmentation module 130, FIG. 2 is provided. Specifically, FIG. 2 shows how segmentation module 130 receives image 210 and then responsively analyzes image 210 to segment object 220 from background environment 230. Then segmentation module 130 may transmit the segmented version of object 220 (perhaps along with other parameters) to transformation module 140.

In example embodiments, image 210 could be a labeled image containing categorical labels for each of its pixels. These categorical labels could help identify the object classes for objects in image 210. For example, pixels in image 210 that correspond to object 220 may be labeled with the categorical label "fire hydrant" whereas the pixels in image 210 that correspond to background environment 230 may be labeled as "background" or "street". Segmentation module 130 can utilize these categorical labels to segment object 220 from background environment 230. Specifically, segmentation module 130 could determine each pixel in image 210 that has a categorical label corresponding to an object of interest (e.g., "fire hydrant") and may extract those determined pixels from image 210. Then, segmentation module 130 could transmit the extracted pixels to transformation module 140.

In some embodiments, an image provided to segmentation module 130 could contain multiple objects of interest. For example, image 210 is shown to contain auxiliary object 222A and auxiliary object 222B, both of which may be labeled with the categorical label "car". In these situations, segmentation module 130 could configured to extract all objects of interest (e.g., extract object 220 along with auxiliary object 222A and auxiliary object 222B) or may be configured to only extract certain objects of interest (e.g., only extract object 220 but not auxiliary object 222A and auxiliary object 222B). In some implementations, a user, for example via a graphical user interface, can provide segmentation module 130 with information on which objects of interest to segment from an input image. In other implementations and as further described below, transformation module 140 and/or prediction module 150 could provide segmentation module 130 with information on which objects of interest to segment from an input image.

In some embodiments, image 210 may be an unlabeled image. In these situations, segmentation module 130 may include an object detection module that may detect various objects in image 210 but may be unable to identify the categorical labels/object classes associated with the detected objects. To obtain these object classes, segmentation module 130 may present the detected objects to a user, perhaps through a graphical user interface, who may assign categorical labels to each of the detected objects. Using the assigned labels, segmentation module 130 may proceed with determining each pixel in image 210 that has a categorical label corresponding to an object of interest and may extract those determined pixels from image 210.

Transformation module 140 may be a software application, computing device, or subsystem within computing system 100 that is operable receive object(s) segmented by segmentation module 130 and responsively apply a transformation function to transform the object(s) into one or more transformed objects. Then, transformation module 140 could transplant the transformed object(s) into one or more background images so as to produce one or more augmented images.

Figure 3:
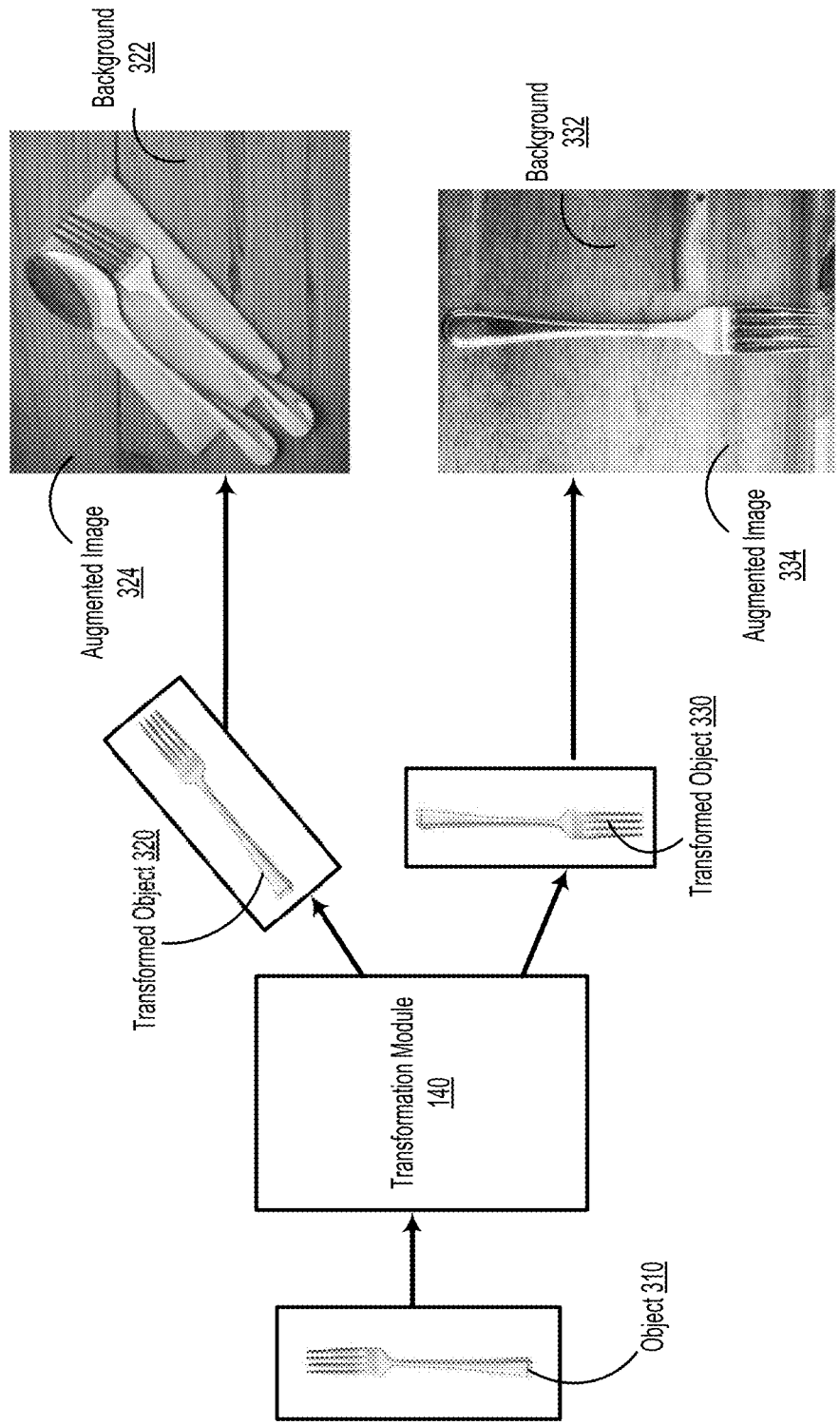
FIG. 3 illustrates operations of a transformation module, in accordance with example embodiments.

To conceptually illustrate the operations of transformation module 140, FIG. 3 is provided. Specifically, FIG. 3 shows how transformation module 140 receives object 310 and transforms object 310 into transformed object 320 and transformed object 330. After this, transformation module 140 transplants transformed object 320 onto background 322 to produce augmented image 324 and transplants transformed object 330 onto background 332 to produce augmented image 334. Both augmented image 324 and augmented image 334 could then be used to augment a training data set used by prediction module 150.

The transformation applied by transformation module 140 could map each pixel in object 310 to one or more output pixels in transformed object 320 (or transformed object 330). The mapping could take the form of an affine transformation, a linear transformation, or another type of image processing transformation. In some cases, the mapping modifies one or more object properties of object 310. These object properties may include, but are not limited to: the height or width of object 310, the relative size of object 310 (e.g., the amount that object 310 is sized up or sized down from its initial size), the relative rotation of object 310 (e.g., the amount that object 310 is rotated clockwise or counterclockwise from its initial orientation), or the color of object 310, among other possibilities. For example, as shown in FIG. 3, transformation module 140 transforms the relative rotation of object 310 approximately 45° clockwise to generate transformed object 320 and transforms the relative rotation of object 310 approximately 180° clockwise to generate transformed object 330.

In some embodiments, transformation module 140 utilizes randomly generated object property values to transform object 310. For instance, transformation module 140 could randomly generate a first rotation value between 0° and 90° and could use the first rotation value as a basis to transform the relative rotation of object 310 and generate a transformed object. Then, transformation module 140 could randomly generate a second rotation value between 0° and 90° and could use the second rotation value as a basis to transform the relative rotation of object 310 and generate a second transformed object.

In some embodiments, transformation module 140 utilizes the ground truth property values of the object being transformed as a basis to perform intelligent and representative object transformations. As described herein, ground truth property values may refer to property values that an object frequently exhibits in real-world images. For example, if real-world images of chairs generally depict chairs having a height of 75 cm, then a ground truth height value for a chair may be 75 cm. Basing transformations on how objects actually appear in real-world images could improve the performance of predictive model 150 when it makes inferences on real-world images.

Figure 4A:
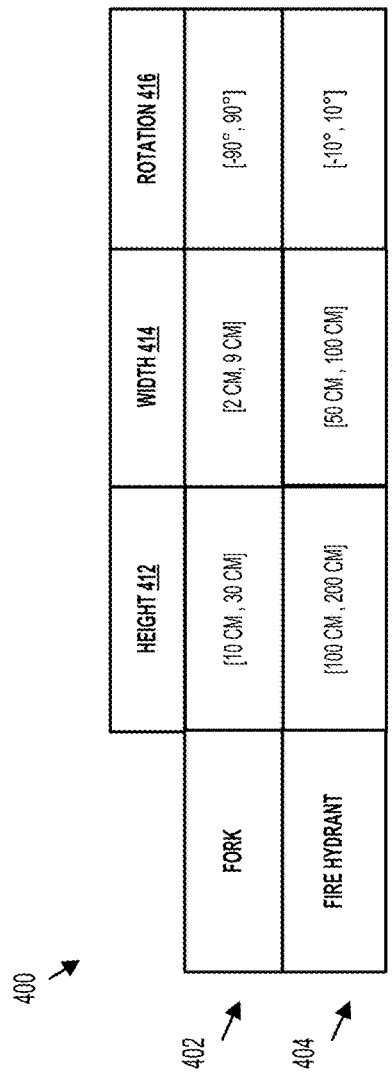
FIG. 4A depicts a ground truth object property table, in accordance with example embodiments.

Examples of ground truth property values are depicted in FIG. 4A. As shown, ground truth table 400 includes record 402 and record 404, both of which have corresponding entries for height property 412, width property 414, and rotation property 416.

Height property 412 could provide transformation module 140 with the necessary details for transforming the height of an object. As shown in FIG. 4A, the height property 412 entry for record 402 indicates that the ground truth height for "fork" objects is between 10 cm and 30 cm. Similarly, the height property 412 entry for record 404 indicates that the ground truth height for "fire hydrant" objects is between 100 cm and 200 cm.

Width property 414 could provide transformation module 140 with the necessary details for transforming the width of an object. As shown in FIG. 4A, the width property 414 entry for record 402 indicates that the ground truth width for "fork" objects is between 2 cm and 9 cm. Similarly, the width property 414 entry for record 404 indicates that the ground truth width for "fire hydrant" objects is between 50 cm and 100 cm.

Rotation property 416 could provide transformation module 140 with the necessary details for transforming the relative rotation of an object. As shown in FIG. 4A, the rotation property 416 entry for record 402 indicates that the ground truth rotation for "fork" objects is between −90° and 90° (e.g., where 0° corresponds to completely vertical, a negative degree corresponds to a counterclockwise rotation from 0°, and a positive degree corresponds to a clockwise rotation from) 0°. Similarly, the rotation property 416 entry for record 404 indicates that the ground truth rotation for "fire hydrant" objects is between −10° and 10°.

The layout and entries in ground truth table 400 are provided as an example and are not intended to be limiting with respect to the embodiments herein. In some implementations, the ground truth property values in ground truth table 400 could be sets of discrete values. In other implementations, the ground truth property values in ground truth table 400 could be ranges of values. Regardless of the implementation, transformation module 140 could use ground truth table 400 to identify the ground truth property values for an object being transformed. From these ground truth property values, transformation module 140 could select a target property value to use for an object transformation. For example, if transformation module 140 were to transform a "fork" object, transformation module 140 may refer to entry 402 in ground truth table 400 and could select a target height value somewhere between 10 cm and 30 cm (e.g., 25 cm). Transformation module 140 would then transform the "fork" object to have a resulting height of 25 cm. The selection of the target property value from the ground truth property values could be performed randomly or could be performed based on a statistical metric of the ground truth property values (e.g., a median value is always selected, values within one standard deviation of a mean are always selected, etc.).

Figure 4B:
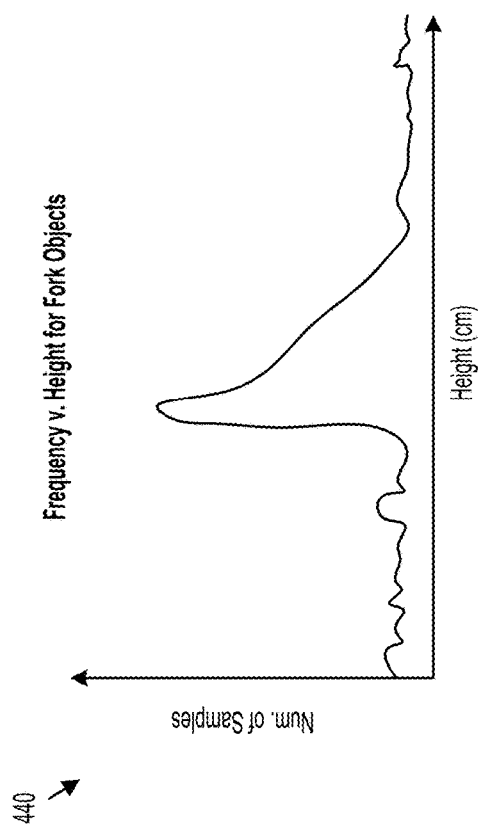
FIG. 4B depicts a frequency distribution, in accordance with example embodiments.

In some embodiments, the ground truth property values in ground truth table 400 are in the form of a frequency distribution. For example, FIG. 4B illustrates frequency distribution 440 for the ground truth height property of a "fork" object, where the x-axis corresponds to height and the y-axis corresponds to the number of the "fork" objects in real-world images that exhibit a specific height. Transformation module 140 could randomly sample a value from frequency distribution 440 to use as the target property value in an object transformation.

Prediction module 150 may contain one or more predictive models including, but not limited to: an artificial neural network, a Bayesian network, a hidden Markov model, a Markov decision process, a logistic regression function, a support vector machine, a statistical machine learning algorithm, and/or a heuristic machine learning system.

During a training phase, the predictive models of prediction module 150 may be trained on an input set of training data to recognize patterns in the training data and provide output inferences and/or predictions about patterns in the training data. The resulting trained predictive models can be called trained predictive models.

In example embodiments, the predictive models can be trained by providing the initial set of images or the augmented set of images generated by transformation module 140 as training input. The predictive models may use various training techniques, such as unsupervised learning, supervised learning, semi-supervised learning, reinforcement learning, transfer learning, incremental learning, or curriculum learning, among other possibilities. The predictive models can be trained using one or more computer processors and/or on-device coprocessors. The on-device coprocessor(s) can include, but are not limited to one or more graphic processing units (GPUs), one or more tensor processing units (TPUs), one or more digital signal processors (DSPs), and/or one or more application specific integrated circuits (ASICs). Such on-device coprocessors can speed up training of the predictive models.

During an inference phase, the trained predictive models of prediction module 150 can receive input data and generate corresponding inference(s) and/or prediction(s) about the input data. In examples, the input data can include a collection of images provided by one or more sources. The collection of images can include images of objects that are similar to the objects used to train the predictive models. The inference(s) and/or prediction(s) made by the trained predictive models can include output images, segmentation masks, numerical values, and/or other output data.

Figure 5:
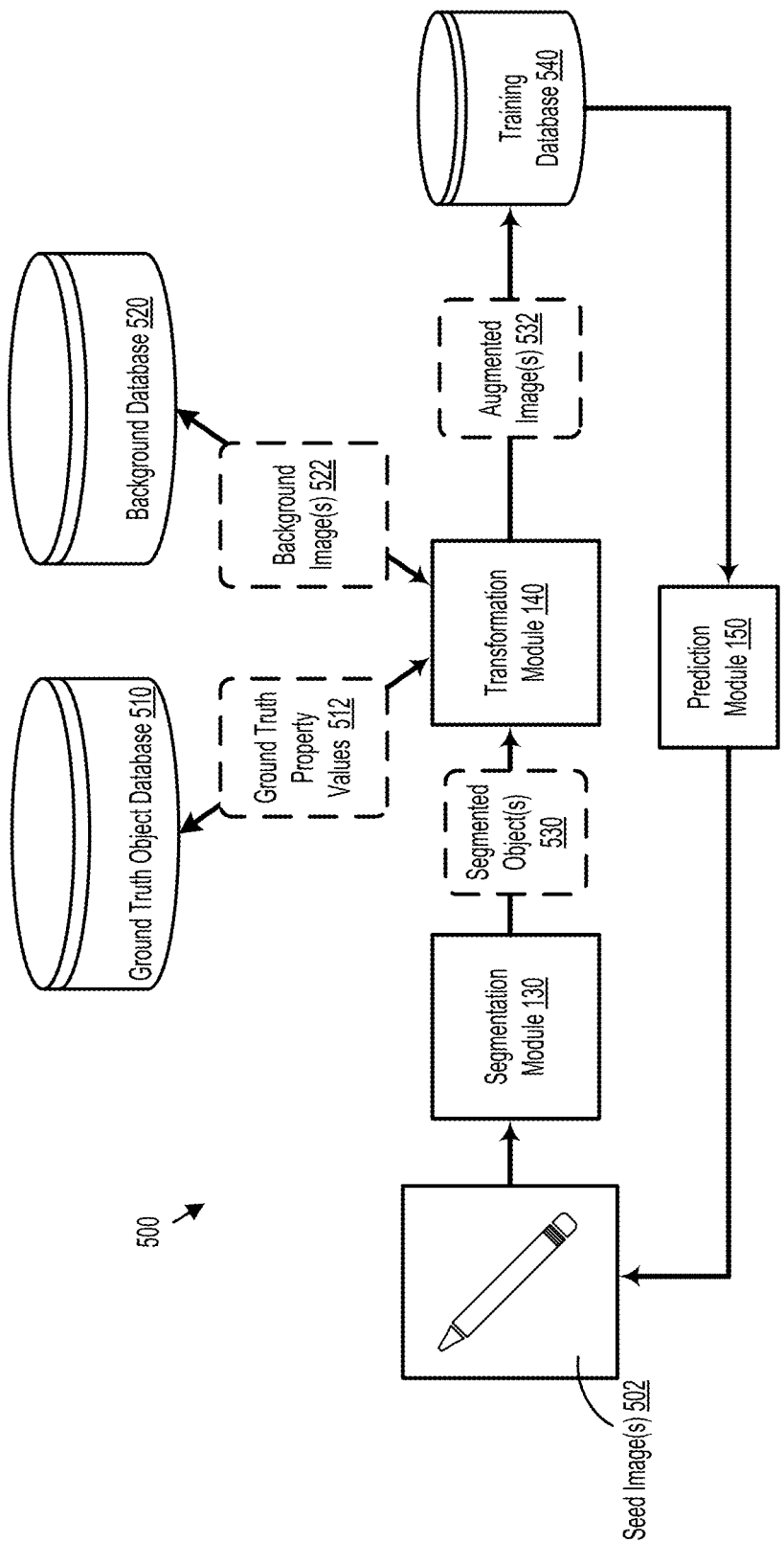
FIG. 5 illustrates an example system, in accordance with example embodiments.

FIG. 5 illustrates system 500, in accordance with example embodiments. System 500 is provided to illustrate the operational relationship between segmentation module 130, transformation module 140, and prediction module 150. In addition to these modules, system 500 includes ground truth object database 510, background database 520, and training database 540. In other embodiments, system 500 may have fewer, more, or alternative elements.

In system 500, segmentation module 130 receives seed image(s) 502 and responsively segments object(s) disposed in seed image(s) 502 from the backgrounds of seed image(s) 502 to generate segmented object(s) 530. In some examples, seed image(s) 502 can be provided by a user. This may be accomplished by way of a web page or series of web pages hosted by system 500 and provided to the user upon request. In other examples, seed image(s) 502 may be provided by prediction module 150. For example, prediction module 150 could detect a class imbalance in training database 540 or augmented image(s) 532 and could transmit images corresponding to underrepresented classes to segmentation module 130.

After the segmenting, transformation module 140 could receive segmented object(s) 530 from segmentation module 130. In addition, transformation module 140 could receive (i) ground truth object properties 512 from ground truth object database 510 and (ii) background image(s) 522 from background database 520.

Ground truth object database 510 may include one or more ground truth tables, such as ground truth table 400, each containing ground truth property values for objects. In some embodiments, a user can provide the ground truth property values to populate ground truth object database 510. In other embodiments, an image analysis system can provide the ground truth property values to populate ground truth object database 510. Such an image analysis system may be operable to receive a set of labeled images and responsively analyze objects in the set of labeled images to determine ground truth property values for each object. Other ways of populating ground truth object database 510 also exist.

Transformation module 140 may utilize the object classes of segmented object(s) 530 to request ground truth property values 512 for segmented object(s) 530. As described above, the object classes of segmented object(s) 530 may be identified via categorical labels associated with the pixels in seed image(s) 502 or may be provided by a user.

Background database 520 could include background images taken/captured from a wide variety of environments. For instance, background database 520 may contain background images taken/captured from parks, offices, streets, playgrounds, beaches, homes, and so on. The variability images in background database 520 helps to further increase the diversity of augmented image(s) 532 generated by transformation module 140.

Transformation module 140 may request and receive background image(s) 522 from background database 520. In some embodiments, transformation module 140 may randomly request background image(s) 522 from background database 520. That is, in response to a request from transformation module 140, background database 520 may transmit any random background image to transformation module 140. In other embodiments, transformation module 140 uses the object classes of segmented object(s) 530 to request specific background image(s) 522 from background database 520. For example, if segmented object(s) 530 only include "cup" objects and "bowl" objects, then it may be more suitable for transformation module 140 to request backgrounds that cups and bowls would likely be found in (e.g., living rooms environments, dining room environments, restaurant environments) rather than backgrounds that cups and bowls would not likely be found in (e.g., the bottom of the ocean, the top of a volcano, etc.).

In line with the discussion above, transformation module 140 could use ground truth property values 512 to transform segmented object(s) 530 into transformed object(s) and then could transplant the transformed object(s) into background image(s) 522 to create augmented image(s) 532.

When transplanting a particular object onto a particular background image, transformation module 140 may determine a target pixel position on the particular background image for which to place the particular transformed object. In some embodiments, transformation module 140 randomly determines the target pixel position. In other embodiments, transformation module 140 uses the object class of the particular transformed object to determine the target pixel position. For instance, the object class of the particular transformed object could be associated with ground truth position values. Similar to ground truth property values, ground truth position values may be pixel positions that an object is frequently located at in real-world images. For example, if images of chairs generally depict chairs being positioned near the centermost pixels of the images, then the ground truth position value for a chair in a background image may be the centermost pixels of the background image.

In some embodiments, the ground truth position values for the particular object could be based on other objects in the particular background image. For instance, the particular background image may contain categorical labels for each of its pixels. Transformation module 140 could use these categorical labels to identify whether the particular background image contains secondary objects of interest. The secondary objects of interest could be based on the object class of the particular object. For example, if the particular object is a "fork" object, then secondary objects of interest may include "table" objects or "counter-top" objects. If transformation module 140 determines that the particular background image contains secondary objects of interest, then transformation module 140 could use the object classes of the secondary objects of interest to determine the ground truth position values for the particular object. For example, a secondary "table" object may specify that all "fork" objects should be positioned near the top of the "table" object. A technical advantage of this approach is that the ground truth position values are based on actual object positions in real-world images. This can further improve the performance of predictive model 150 when it makes inferences on real-world images.

The augmented image(s) 532 generated by transformation module 140 could be added to existing images contained in training database 540. Together, the existing images and augmented image(s) 532 could be used to train predictive models in prediction module 150.

In some embodiments, prediction module 150 may determine class imbalances in augmented image(s) 532. To do this, a user may first provide prediction module 150 with a set of object classes that they believe should be evenly represented in augmented image(s) 532. Prediction module 150 could then determine the frequency at which each of the provided object classes appears in augmented image(s) 532. For example, if the user instructs prediction module 150 to determine whether augmented image(s) 532 contains a class balance between "fork" objects and "spoon" objects, then prediction module 150 may determine the frequency at which "fork" objects appear in augmented image(s) 532 and may determine the frequency at which "spoon" objects appear in augmented image(s) 532. After this, prediction module 150 could determine whether the frequency r any object class is below a threshold. In some implementations, the threshold could be based on the frequency at which each of the provided object classes appears in augmented image(s) 532. For example, the threshold could be based on the median or mean frequency that each of the provided object classes appears in augmented image(s) 532. In other implementations, the threshold could be based on a percentage value (e.g., whether an object class is represented in at least 35% or 45% of the images in augmented image(s) 532). If the frequency for a given object class is below the threshold, prediction module 150 may select from augmented image(s) 532 an image containing the given object class and may transmit that image to segmentation module 130 to be used as a seed image. The determination of class imbalances could occur before or after augmented image(s) 532 are added to training database 540.

III. Example Methods

Figure 6:
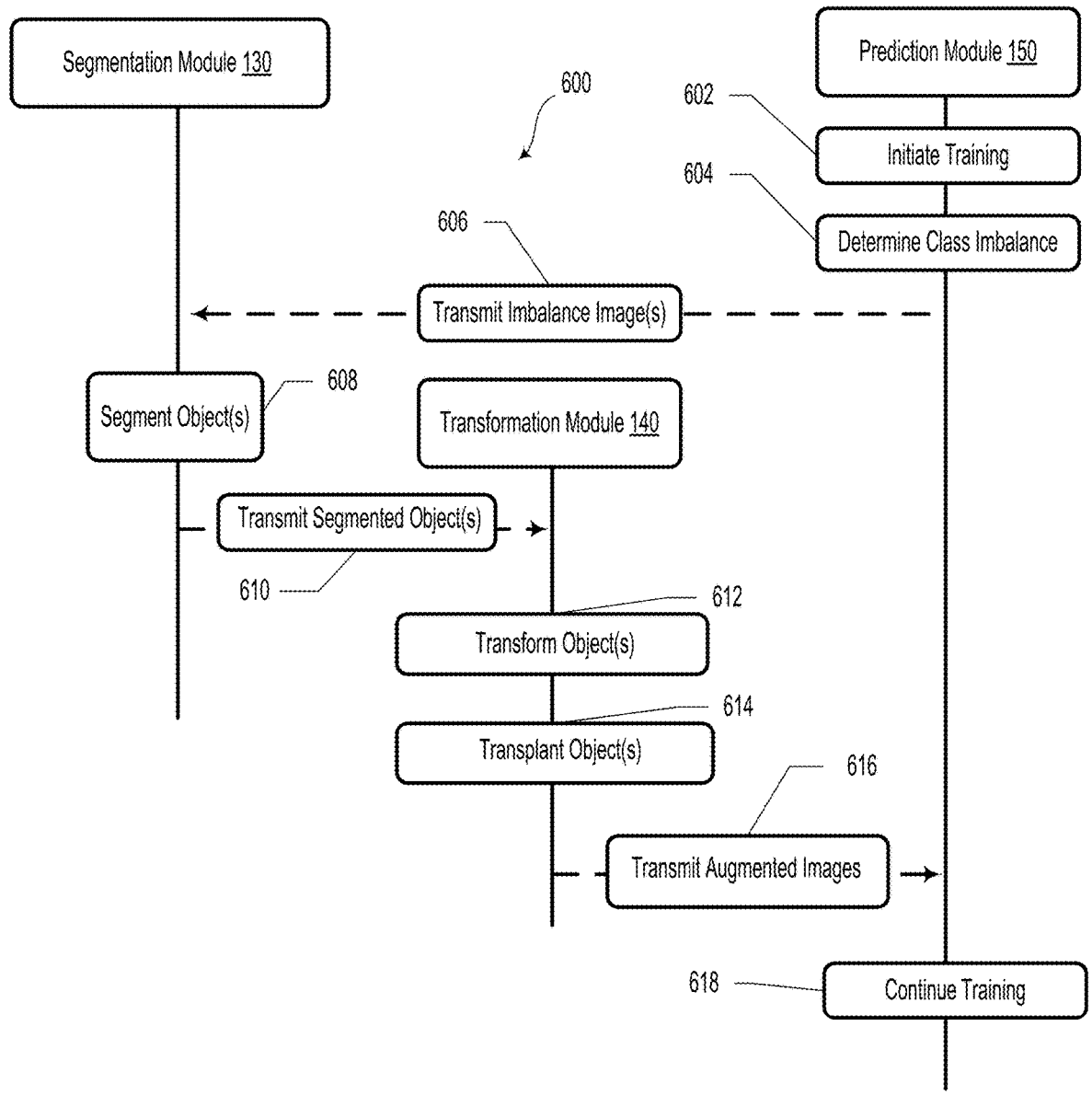
FIG. 6 depicts a message flow, in accordance with example embodiments.

FIG. 6 depicts message flow 600, in accordance with example embodiments. Message flow 600 illustrates a process in which prediction module 150 identifies imbalances in its training data, temporarily suspends its training, and requests additional augmented images to balance its training data. By way of example, message flow 600 may utilize segmentation module 130, transformation module 140, and prediction module 150 during operations. However, additional components, steps, or blocks may be added to message flow 600 without departing from the scope of this disclosure.

At block 602, prediction module 150 begins training one or more predictive models using an initial set of training data. The initial set of training data could be contained within prediction module 150 or may be requested by prediction module 150 from a training database, such as training database 540.

At block 604, prediction module 150 determines a class imbalance in the initial set of training data. As described above, this may involve a user may providing prediction module 150 with a set of object classes that they believe should be evenly represented in the initial set of training data and then prediction module 150 determining the frequency at which each of the provided object classes appears in the initial set of training data. After determining an underrepresented object class, at block 606 prediction module 150 transmits one or more images of the underrepresented object class to segmentation module 130.

At block 608, segmentation module 130 receives the image(s) of the underrepresented object class and responsively segments underrepresented object(s) from the image(s). Then at block 610, segmentation module 130 transmits the segmented object(s) to transformation module 140.

At block 612, transformation module 140 may receive the segmented object(s) from segmentation module 130 and may responsively transform the segmented object(s) into one or more transformed objects. The transformation at block 612 may utilize the ground truth property values for the segmented object(s). In some embodiments, the ground truth property values are stored in transformation module 140. In other embodiments, block 612 involves transformation module 140 requesting and receiving the ground truth property values from a ground truth object database, such as ground truth object database 510.

At block 614, transformation module 140 may transplant the transformed object(s) onto one or more background image to generate one or more augmented images. The background images used at block 614 may be based on the ground truth property values for the segmented object(s). In some embodiments, the background image(s) are stored in transformation module 140. In other embodiments, block 614 involves transformation module 140 requesting and receiving the background image(s) from a background database, such as background database 520.

At block 616, transformation module 140 transmits the augmented image(s) generated at block 614 to prediction module 150. In some embodiments, block 616 may additional and/or alternatively involve transformation module 140 transmitting the augmented image(s) to a training database containing data for training prediction module 150, such as training database 540.

At block 618, prediction module 150 may resume training using the initial images from block 602 in addition to the augmented image(s) received at block 616. In some embodiments, after training is complete prediction module 150 may apply the trained predictive models onto a validation data set. If the trained predictive models perform poorly on a particular class of objects (e.g., an area under ROC curve below 0.5 or an accuracy below 0.5), prediction module 150 may request from segmentation module 130/transformation module 140 additional augmented image(s) for the poorly performing class. Prediction module 150 may retrain the predictive models with these additional augmented image(s) to increase the overall performance of the predictive models.

IV. Example Operations

Figure 7:
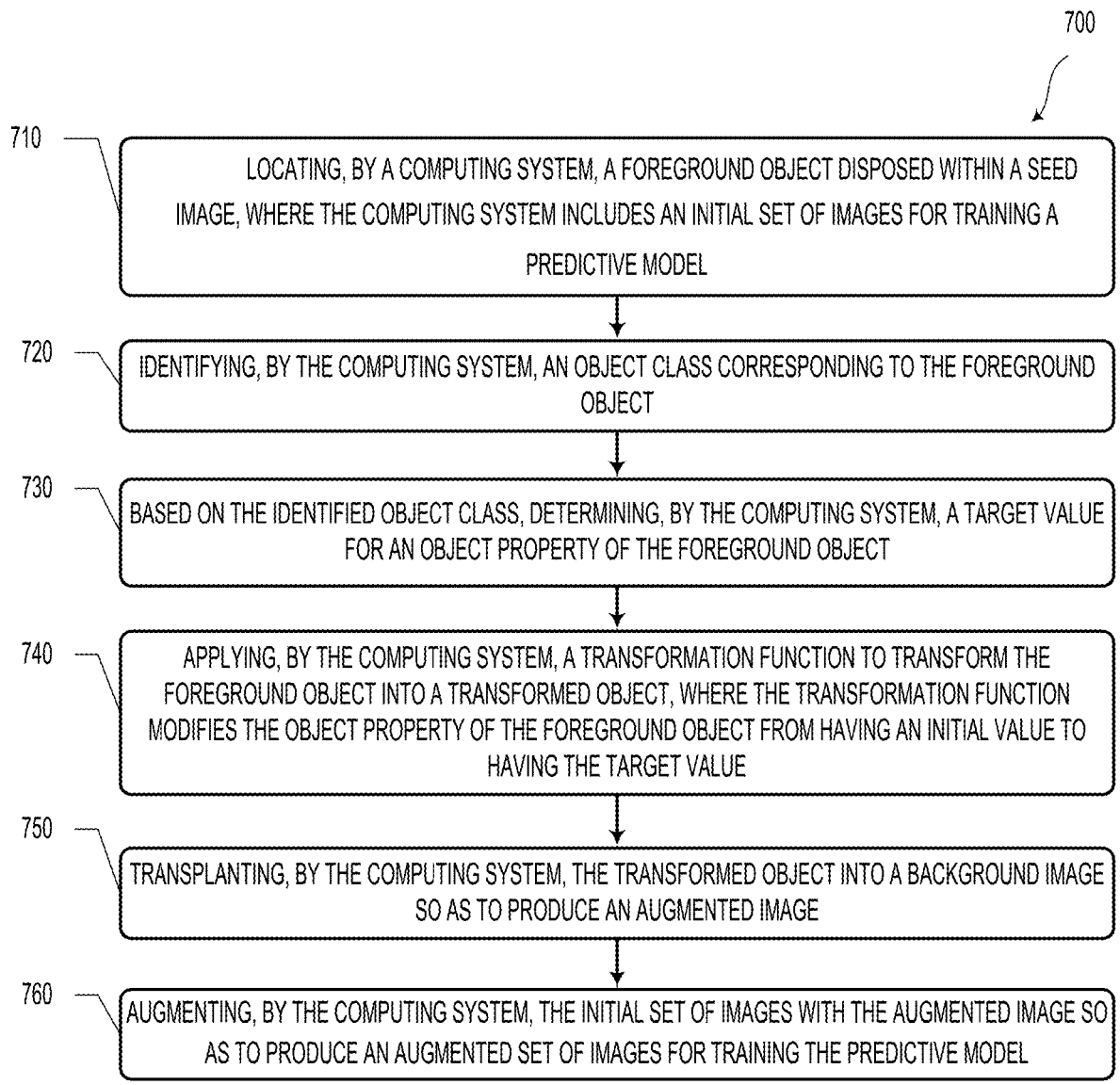
FIG. 7 illustrates a method, in accordance with example embodiments.

FIG. 7 illustrates a method 700, in accordance with example embodiments. Method 700 may include various blocks or steps. The blocks or steps may be carried out individually or in combination. The blocks or steps may be carried out in any order and/or in series or in parallel. Further, blocks or steps may be omitted or added to method 700. The blocks of method 700 may be carried out by various elements of computing system 100 as illustrated and described in reference to FIG. 1.

Block 710 may involve locating, by a computing system, a foreground object disposed within a seed image. The computing system may include an initial set of images for training a predictive model.

Block 720 may involve identifying, by the computing system, an object class corresponding to the foreground object.

Block 730 may involve, based on the identified object class, determining, by the computing system, a target value for an object property of the foreground object;

Block 740 may involve applying, by the computing system, a transformation function to transform the foreground object into a transformed object, where the transformation function modifies the object property of the foreground object from having an initial value to having the target value.

Block 750 may involve transplanting, by the computing system, the transformed object into a background image so as to produce an augmented image.

Block 760 may involve augmenting, by the computing system, the initial set of images with the augmented image so as to produce an augmented set of images for training the predictive model.

In some embodiments, the object property includes a relative size or a relative rotation of the foreground object. In other embodiments, the object property includes a height, a width, or a color of the foreground object.

In some embodiments, the identified object class includes a set of possible target values for the object property and determining the target value for the object property comprises selecting the target value from the set of possible target values. The target value could be selected randomly from the set of possible target values or could be selected based on statistically properties of the set of possible target values.

In some embodiments, the set of possible target values includes a probability distribution for the object property and selecting the target value from the set of possible target values comprises taking a random sample from the probability distribution.

In some embodiments, transplanting the transformed object into the background image comprises determining a target position value for the foreground object and placing the transformed object in the background image in accordance with the target position value.

In some embodiments, the identified object class includes a set of possible target position values for the foreground object and determining the target position value for the foreground object comprises selecting the target position value from the set of possible target position values.

Some embodiments involve based on the identified object class, establishing, by the computing system, secondary objects of interest and determining, by the computing system, that the background image contains at least one of the secondary objects of interest, where placing the transformed object in the background image in accordance with the target position value comprises placing the transformed object to be adjacent to at least one of the secondary objects of interest.

Some embodiments involve, after augmenting the initial set of images, determining, by the computing system and for each object class of a plurality of object classes, a frequency at which the object class appears in the augmented set of images. These embodiments may further involve, based on the frequency, determining, by the computing system, a second seed image.

In some embodiments, determining the second seed image comprises making a determination, for the object class, that the frequency at which the object class appears in the augmented set of images is below a threshold and, based on the determination, selecting, from the augmented set of images, an image that is associated with the object class to be the second seed image.

Some embodiments involve locating, by the computing system, a second foreground object disposed within the second seed image and identifying, by the computing system, a second object class corresponding to the second foreground object. Such embodiments may also involve, based on the identified second object class, determining, by the computing system, a target value for an object property of the second foreground object and applying, by the computing system, a transformation function to transform the second foreground object into a second transformed object, where the transformation function modifies the object property of the second foreground object from having an initial value to having the target value. Such embodiments may further involve transplanting, by the computing system, the second transformed object into the background image so as to produce a second augmented image and augmenting, by the computing system, the augmented set of images with the second augmented image so as to produce a second augmented set of images for training the predictive model.

In some embodiments, the transformation function is an affine image transformation. For example, the transformation function could map each pixel in the foreground object to one or more output pixels in the transformed object. In other embodiments, the transformation function is a linear transformation. In some embodiments, both the foreground object and the transformed object are associated with the object class.

Some embodiments involve training, by the computing system, the predictive model to determine a respective object class associated with each image in the augmented set of images.

Some embodiments involve selecting, from the initial set of images, a candidate image to be the seed image. Some embodiments involve receiving, from a client device, the seed image.

In some embodiments, the computing system is a robotic system that operates in a plurality of environments and the initial set of images are images previously captured by the robotic system as the robotic system operated in the plurality of environments.

In some embodiments, identifying the object class corresponding to the foreground object comprises generating one or more graphical user interfaces that contain data fields for inputting the object class; transmitting, to a client device, the one or more graphical user interfaces; and receiving, from the client device, the object class by way of the data fields.

Some embodiments involve, based on the identified object class, determining, by the computing system, a second target value for an object property of the foreground object. Such embodiments also involve applying, by the computing system, a second transformation function to transform the foreground object into a second transformed object, where the second transformation function modifies the object property of the foreground object from having an initial value to having the second target value. Such embodiments further involve transplanting, by the computing system, the second transformed object into the background image so as to produce a second augmented image and augmenting, by the computing system, the augmented set of images with the second augmented image so as to produce a second augmented set of images for training the predictive model.

Some embodiments involve, based on the identified object class, determining, by the computing system, a target value for a second object property of the foreground object, where the transformation function further modifies the second object property of the foreground object from having an initial value to having the target value.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

We claim:

1. A computer-implemented method comprising:
locating, by a computing system, a foreground object disposed within a seed image, wherein the computing system includes an initial set of images for training a predictive model;
identifying, by the computing system, an object class corresponding to the foreground object;
based on the identified object class, determining, by the computing system, a target value for an object property of the foreground object;
applying, by the computing system, a transformation function to transform the foreground object into a transformed object, wherein the transformation function modifies the object property of the foreground object from having an initial value to having the target value;
transplanting, by the computing system, the transformed object into a background image so as to produce an augmented image; and
augmenting, by the computing system, the initial set of images with the augmented image so as to produce an augmented set of images for training the predictive model.

2. The computer-implemented method of claim 1, wherein the object property includes a relative size or a relative rotation of the foreground object.

3. The computer-implemented method of claim 1, wherein the identified object class includes a set of possible target values for the object property, and wherein determining the target value for the object property comprises selecting the target value from the set of possible target values.

4. The computer-implemented method of claim 3, wherein the set of possible target values includes a probability distribution for the object property, and wherein selecting the target value from the set of possible target values comprises taking a random sample from the probability distribution.

5. The computer-implemented method of claim 1, wherein transplanting the transformed object into the background image comprises:
determining a target position value for the foreground object; and
placing the transformed object in the background image in accordance with the target position value.

6. The computer-implemented method of claim 5, wherein the identified object class includes a set of possible target position values for the foreground object, and wherein determining the target position value for the foreground object comprises selecting the target position value from the set of possible target position values.

7. The computer-implemented method of claim 5, further comprising:
based on the identified object class, establishing, by the computing system, secondary objects of interest; and determining, by the computing system, that the background image contains at least one of the secondary objects of interest, wherein placing the transformed object in the background image in accordance with the target position value comprises placing the transformed object to be adjacent to at least one of the secondary objects of interest.

8. The computer-implemented method of claim 1, further comprising:
   after augmenting the initial set of images, determining, by the computing system and for each object class of a plurality of object classes, a frequency at which the object class appears in the augmented set of images; and
   based on the frequency, determining, by the computing system, a second seed image.

9. The computer-implemented method of claim 8, wherein determining the second seed image comprises:
   making a determination, for the object class, that the frequency at which the object class appears in the augmented set of images is below a threshold; and
   based on the determination, selecting, from the augmented set of images, an image that is associated with the object class to be the second seed image.

10. The computer-implemented method of claim 8, further comprising:
    locating, by the computing system, a second foreground object disposed within the second seed image;
    identifying, by the computing system, a second object class corresponding to the second foreground object;
    based on the identified second object class, determining, by the computing system, a target value for an object property of the second foreground object;
    applying, by the computing system, a transformation function to transform the second foreground object into a second transformed object, wherein the transformation function modifies the object property of the second foreground object from having an initial value to having the target value;
    transplanting, by the computing system, the second transformed object into the background image so as to produce a second augmented image; and
    augmenting, by the computing system, the augmented set of images with the second augmented image so as to produce a second augmented set of images for training the predictive model.

11. The computer-implemented method of claim 1, wherein the transformation function is an affine image transformation.

12. The computer-implemented method of claim 1, wherein both the foreground object and the transformed object are associated with the object class.

13. The computer-implemented method of claim 1, further comprising:
    training, by the computing system, the predictive model to determine a respective object class associated with each image in the augmented set of images.

14. The computer-implemented method of claim 1, further comprising selecting, from the initial set of images, a candidate image to be the seed image.

15. The computer-implemented method of claim 1, wherein the computing system is a robotic system that operates in a plurality of environments, and wherein the initial set of images are images previously captured by the robotic system as the robotic system operated in the plurality of environments.

16. The computer-implemented method of claim 1, wherein identifying the object class corresponding to the foreground object comprises:
    generating one or more graphical user interfaces that contain data fields for inputting the object class;
    transmitting, to a client device, the one or more graphical user interfaces; and
    receiving, from the client device, the object class by way of the data fields.

17. The computer-implemented method of claim 1, further comprising:
    based on the identified object class, determining, by the computing system, a second target value for an object property of the foreground object;
    applying, by the computing system, a second transformation function to transform the foreground object into a second transformed object, wherein the second transformation function modifies the object property of the foreground object from having an initial value to having the second target value;
    transplanting, by the computing system, the second transformed object into the background image so as to produce a second augmented image; and
    augmenting, by the computing system, the augmented set of images with the second augmented image so as to produce a second augmented set of images for training the predictive model.

18. The computer-implemented method of claim 1, further comprising:
    based on the identified object class, determining, by the computing system, a target value for a second object property of the foreground object, wherein the transformation function further modifies the second object property of the foreground object from having an initial value to having the target value.

19. A computing system comprising:
    an initial set of images for training a predictive model; and
    one or more processors configured to cause the computing system to carry out operations comprising:
       locating a foreground object disposed within a seed image;
       identifying an object class corresponding to the foreground object;
       based on the identified object class, determining a target value for an object property of the foreground object;
       applying a transformation function to transform the foreground object into a transformed object, wherein the transformation function modifies the object property of the foreground object from having an initial value to having the target value;
       transplanting the transformed object into a background image so as to produce an augmented image; and
       augmenting the initial set of images with the augmented image so as to produce an augmented set of images for training the predictive model.

20. An article of manufacture including a non-transitory computer-readable medium, having stored thereon program instructions that, upon execution by one or more processors of a computing system that contains an initial set of images for training a predictive model, cause the computing system to carry out operations comprising
    locating a foreground object disposed within a seed image;
    identifying an object class corresponding to the foreground object;

based on the identified object class, determining a target value for an object property of the foreground object;

applying a transformation function to transform the foreground object into a transformed object, wherein the transformation function modifies the object property of the foreground object from having an initial value to having the target value;

transplanting the transformed object into a background image so as to produce an augmented image; and augmenting the initial set of images with the augmented image so as to produce an augmented set of images for training the predictive model.

* * * * *